(12) United States Patent
Pratt

(10) Patent No.: US 6,185,898 B1
(45) Date of Patent: Feb. 13, 2001

(54) HIGH STRENGTH WALL FRAMES AND SYSTEM UTILIZING SAME

(76) Inventor: Robert F. Pratt, 13954 NE. 60$^{th}$ Way, #104, Redmond, WA (US) 98052

( * ) Notice: Under 35 U.S.C. 154(b), the term of this patent shall be extended for 0 days.

(21) Appl. No.: 09/113,465

(22) Filed: Jul. 10, 1998

(51) Int. Cl.$^7$ ...................................................... E04C 2/38
(52) U.S. Cl. ..................... 52/657; 52/167.3; 52/651.06; 52/653.1; 52/665; 52/693; 52/695; 52/705; 403/231; 403/232.1; 403/237
(58) Field of Search .................. 52/23, 167.1, 167.3, 52/650.2, 651.06, 651.09, 656.1, 657, 693, 695, 704, 705, 653.1, 664, 665, 481.1, 481.2, 482; 403/231, 232.1, 237, 402, 403

(56) References Cited

U.S. PATENT DOCUMENTS

| | | |
|---|---|---|
| 689,714 | 12/1901 | Goeller . |
| 1,923,961 | 8/1933 | Wood . |
| 2,126,511 | 8/1938 | Soulé . |
| 2,591,352 | 4/1952 | Harbison . |
| 2,622,284 | 12/1952 | Kafer . |
| 3,333,874 | * 8/1967 | Gelfarb . |
| 4,030,264 | * 6/1977 | Jackson ................................... 52/693 |
| 4,441,289 | * 4/1984 | Ikuo et al. .............................. 52/167 |
| 5,167,073 | 12/1992 | Stein . |
| 5,323,905 | 6/1994 | Gerondale et al. . |
| 5,438,811 | * 8/1995 | Goya ...................................... 52/702 |
| 5,491,949 | * 2/1996 | De Moor ................................. 52/65 |
| 5,657,606 | * 8/1997 | Ressel et al. ........................... 52/690 |
| 5,664,388 | * 9/1997 | Chapman et al. .................... 52/653.1 |

FOREIGN PATENT DOCUMENTS

| | | | |
|---|---|---|---|
| 401203571 | * 8/1989 | (JP) | ...................................... 52/648.1 |
| 402085437 | * 3/1990 | (JP) | ...................................... 52/648.1 |

* cited by examiner

*Primary Examiner*—Carl D. Friedman
*Assistant Examiner*—Yvonne M. Horton
(74) *Attorney, Agent, or Firm*—David V. Carlson; Seed I.P. Law Group PLLC

(57) ABSTRACT

A shear frame assembly of the type having a pair of tensioned diagonal straps that provide resistance to shear loads. The shear frame assembly includes a pair of laterally opposed vertical supports each having a first end portion and each vertical support has an aperture in its first end portion. The aperture is sized to receive one of the tensioned diagonal straps therethrough. Transverse top and bottom plates extend between the end portions of the vertical supports. A strap-alignment member is positioned in each aperture and each alignment member is positioned to receive and align the tensioned strap within the aperture. A force distributing member is positioned in each aperture and interposed between the alignment member and the respective vertical support. Each vertical support is formed by three studs that are connected together by bands that wrap around the studs so as to sandwich the middle stud between inner and outer studs. A building system for constructing a building using the shear frame assemblies includes a plurality of building wall frame assemblies and shear brace assemblies that are interconnected to each other in a configuration that forms the selective walls of the building. Each shear frame assembly is connected to at least one other shear frame assembly or a wall frame assembly.

32 Claims, 13 Drawing Sheets

HIGH STRENGTH WALL FRAMES AND SYSTEM UTILIZING SAME

TECHNICAL FIELD

The present invention relates to building wall components, and in particular to high-stress resistant shear frames of the type using diagonal tensioning members and building systems using the same.

BACKGROUND OF THE INVENTION

Residential and light commercial buildings usually are made up of at least three main elements: a foundation, walls, and a roof. For a multi-storied building, the adjacent stories are separated by a floor/ceiling structure which forms the floor of one story and the ceiling of the story below. The walls are constructed to withstand vertical and horizontal loads applied to the building. Static vertical loads can be applied to the building by, for example, the weight of snow collecting on the roof, while horizontal loads can be applied by high wind force against the side of the building. Dynamic vertical and horizontal loads can also be applied to the building by seismic activity and gusting winds. In addition to their load-carrying capacity, the walls serve to enclose the interior of the building to help keep out the elements and provide space through which essential building systems such as plumbing and electrical wire can be routed.

Given the important role the walls play in the durability and strength of a building, their construction is important. There are currently two main methods of constructing open frame walls of a building: the walls may be framed entirely in the field at a job site, or they may be framed by assembling many pre-fabricated panelized wall sections, including shear braces or shear panels, which are delivered to the job site. Each of these methods have several advantages and disadvantages.

In field framing, walls are typically framed so as to include shear panels at selected locations along the walls. The shear panel is designed to withstand anticipated maximum horizontal and vertical loads exerted on the building wall. A conventional field-framed shear panel is constructed by securing a series of vertical studs to cross members and to the foundation. Face sheets of a selected material, such as plywood, are attached to the studs to provide shear resistance. Flexibility is the main advantage of field framing, since the wall's section can be easily tailored to account for changes and irregularities in the job site. If, for example, the measurements of the foundation are slightly off, the contractor can easily construct the wall's sections, including the shear panels, to fit the foundation. The main disadvantage of field framing is that it is labor intensive and thus increases the construction cost. Furthermore, if any of the walls sustain significant damage, they are difficult and costly to repair or replace.

Framing using pre-fabricated panels usually involves joining several pre-fabricated panels, including shear panels, in a selected configuration to form the building walls. Pre-fabricated shear panels come in two main types. The first includes four structural members that form the perimeter of a quadrilateral, with a face sheet of a selected material, such as plywood, secured to the four structural members to give the panel shear strength. The second type of pre-fabricated shear panel is the type described in co-pending U.S. patent application Ser. No. 09/034,603, filed Mar. 3, 1998, and entitled HIGH STRESS RESISTANCE FRAME BUILDINGS AND METHOD APPARATUS FOR USE IN THE SAME, which is hereby incorporated in its entirety by reference thereto. This pre-fabricated shear panel includes four structural members in a quadrilateral arrangement and a pair of diagonal brace members extending between opposite corners of the quadrilateral. Thus, when a shear load is applied to the shear panel, the load is carried by tension and compression loads in the diagonal brace members.

The primary advantage of using pre-fabricated wall panels is ease and cost of construction: a building can be assembled more easily and quickly using pre-fabricated panels with the shear panels positioned at selected locations, thus reducing construction costs and total building time. But there are disadvantages. Using exclusively pre-fabricated panels make it difficult to adjust to irregularities in the job site. If, for example, the dimensions of the foundation are not what they should be, it is difficult to adjust the pre-fabricated panels to achieve a proper fit. Furthermore, the first type of pre-fabricated shear panel can restrict access to the wall and makes the job more difficult for subsequent subcontractors who must install components in the wall such as plumbing, insulation and electrical wire.

The diagonally braced shear panels are an improvement over the more traditional studs-and-plywood frame, but they experience other problems, most notably that the corners of the frame where the diagonal bands attach require a significant amount of hardware to provide an attachment that can withstand the loads transmitted through the diagonal brace members. This hardware results in a heavier and more expensive shear panel, thereby reducing the cost efficiency of using the panelized wall frames.

SUMMARY OF THE INVENTION

The present invention provides a shear frame assembly highly resistant to lateral or shear loads and overcomes problems experienced in the prior art. The present invention also provides a building system that uses these shear frame assemblies in building construction.

One embodiment of the present invention provides a pre-tensioned shear frame of the type having diagonal tensioning members that provide shear load resistance. The shear frame includes a pair of laterally opposed structural members each having apertures in their respective end portions. A transverse member extends between the end portions of the structural members. The apertures are sized to receive one of the diagonal tensioning members therethrough which extends between opposite corners of the shear frame. A band alignment member is positioned in each aperture to receive and align the diagonal tensioning members within the aperture. A force-distributing member is positioned in each aperture and is interposed between the strap-alignment member and the respective structural member.

In an exemplary embodiment, the shear frame has intermediate members parallel to and spaced apart between the structural members. The shear frame also has intermediate shear blocks parallel to and positioned between the transverse members. The intermediate members and the shear blocks augment the strength of the frame and allow the strength to be tailored as required by the application.

In an alternate embodiment, the shear frame assembly is a field-tensioned frame usable with diagonal tensioned straps. The shear frame assembly includes a pair of laterally opposed structural members each having apertures in their top end portions. Each aperture has a force-distributing member and a band alignment member therein and is sized to receive one of the tensioned straps therethrough. The lower end portion of each structural member rests on a support structure and has lower shear blocks attached thereto. The lower shear blocks also rest on the support structure and extend between the lower end portions of the structural members. Band attachment members are attached to the lower shear blocks adjacent to each structural member. The band attachment members are each sized to receive one of the tensioned straps therethrough, and an alignment member is positioned in the band attachment member. The alignment member is positioned to engage and align the tensioned strap extending between opposite corners of the frame.

In one embodiment, the structural members are formed by a plurality of studs strapped together by flexible strapping. The studs are wood in one embodiment. In an alternate embodiment, the structural member is formed by a pair of outer metal studs that sandwich a non-metal stud, such as a wood stud, therebetween.

A system for using these shear frames includes several of the shear frames and pre-fabricated wall panels placed adjacent to each other in a configuration that forms selected walls of the building and attaching the shear frames and wall panels to a support structure using anchor members and to each other using bands wrapped around the abutting structural members of each panel. Alternatively, the walls may be framed by using a combination of pre-fabricated shear panels with field-framed wall sections filling the interstices between the pre-fabricated shear frames.

DETAILED DESCRIPTION OF THE INVENTION

Shear frame assemblies in accordance with exemplary embodiments of the present invention are described in detail herein. The shear frame assembly is of the type used with diagonal tensioning members. The shear frame assemblies of one embodiment includes pre-tensioned panels manufactured at a remote site, such as a factory, and delivered as a pre-manufactured unit to a building site. Another embodiment includes a shear frame assembly that is built at the job site, such as during framing of the walls. In one embodiment, the shear frame is constructed generally of wood, and in an alternate embodiment the shear frame is constructed generally of metal, such as steel. In the following description, numerous specific details are set forth to provide a thorough understanding of the embodiments of the present invention. One skilled in the relevant art, however, will readily recognize that the present invention can be practiced without one or more of the specific details described herein.

Figure 1:
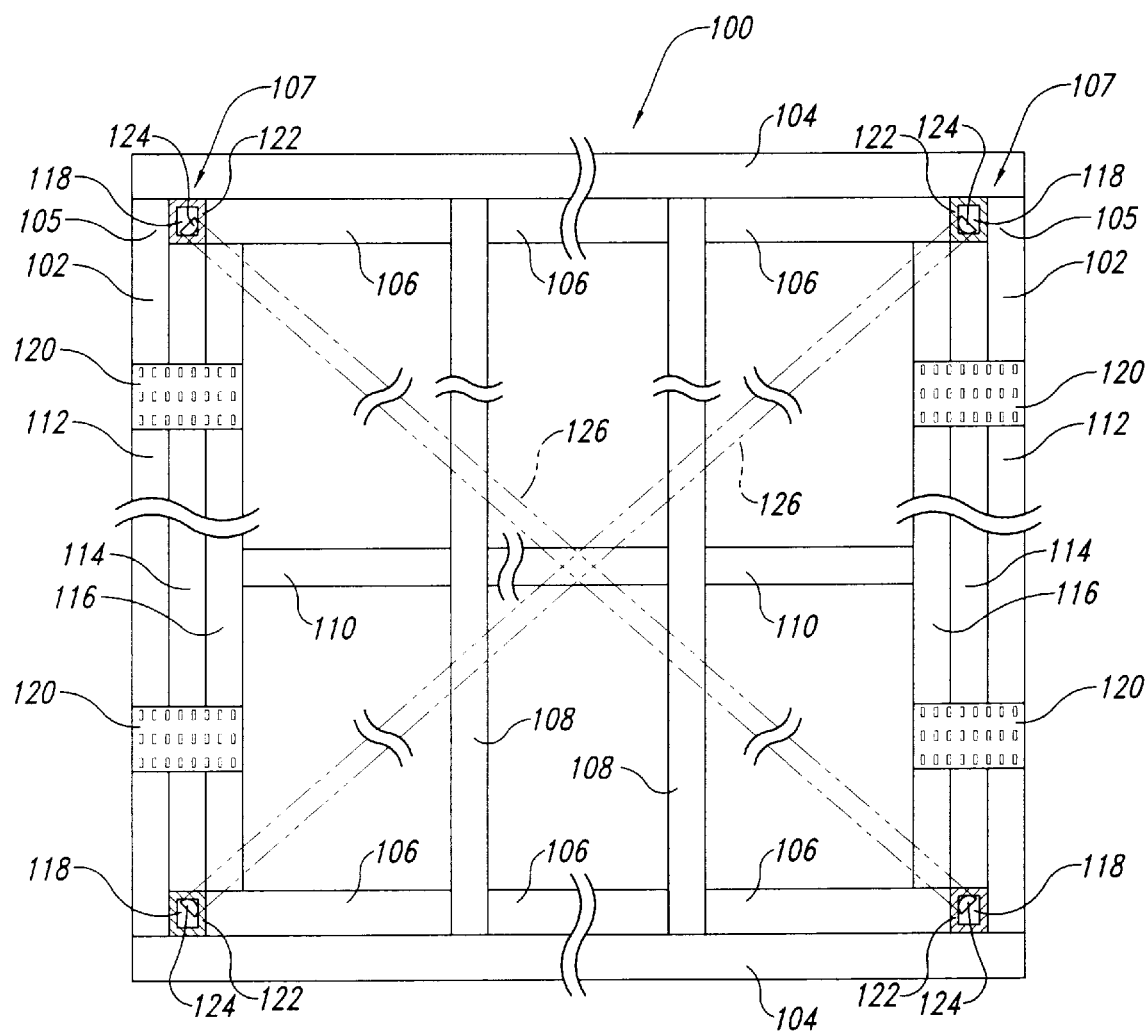
FIG. 1 is a side elevation view of a pre-tensioned shear frame assembly of an exemplary embodiment of the present invention, with tensioned, flexible straps shown in phantom lines.

As best seen in FIG. 1, a pre-tensioned shear frame assembly 100 in accordance with an exemplary embodiment of the present invention has a quadrilateral shape defined by left and right vertical supports 102 and horizontal top and bottom plates 104 that define transverse members extending between end portions 105 of the vertical supports. The end portions 105 of the vertical supports 102 are connected to the top and bottom plates 104 to define four corner areas 107 of the shear frame 100. Each corner area 107 is adapted to receive and retain a flexuous tensioned strap 126, shown in phantom lines. The shear frame 100 uses two tensioned straps 126 that extend diagonally between opposing corner areas 107, so the two tensioned straps form an "X" in the shear frame. Each tensioned strap 126 extends through the respective opposing corner areas 107, and the straps ends are secured to each other when the strap is tensioned to a selected value. Accordingly, the tensioned strap 126 defines a continuous tensioned loop extending between the opposing corner areas 107. This continuous tensioned loop "preloads" the shear frame 100 so as to resist shear loads exerted on the frame.

The shear frame 100 also includes shear blocks 106 connected to the top and bottom plates 104 and coupled to the end portions 105 of the vertical supports 102. The shear blocks 106 transmit shear loads exerted on the shear frame 100 to the end portions 105 of the vertical supports 102. The shear frame 100 also has a plurality of intermediate studs 108 extending between the top and bottom plates 104 and spaced between the left and right vertical supports 102. Shear blocks 106 are also positioned between the studs 108 so a shear force will be distributed across the entire top or bottom of the shear frame 100. In the exemplary embodiment, the shear frame 100 also includes a plurality of intermediate shear blocks 110 positioned along the middle of the shear frame and extending between the vertical supports 102 and the studs 108. Accordingly, shear loads exerted along the middle of the shear frame 100 will be distributed across the shear frame. The shear frame assemblies of the exemplary embodiments are constructed with different dimensions, including 8'×8', 8'×4', 8'×2', 4'×4' frames, or other selected dimensions, and the intermediate studs 108 are spaced on 24" centers.

As best seen in FIG. 1, the left and right vertical supports 102 are the shear frame's main structural members for resisting vertical loads. Each vertical support 102 is formed by an outer stud 112, a middle stud 114, and an inner stud 116, all three of which are held together by a plurality of truss plate connectors 120. Each truss plate connector 120 is securely connected to the outer, middle, and inner studs 112, 114, and 116. In the exemplary embodiment, two spaced-apart truss plate connectors 120 are attached to the vertical support's front side, and two truss plate connectors are attached to the vertical support's rear side (not shown). The truss plate connectors 120 prevent the outer, middle, and inner studs 112, 114, and 116 from separating when forces are applied to the shear frame 100.

When the outer, middle, and inner studs 112, 114, and 116 are secured together, the outer stud extends fully between the top and bottom plates 104. The inner stud 116 and middle stud 114 are equal in length and are both shorter than the outer stud 112, and the inner stud extends fully between the ends of the shear blocks 106. The middle stud 114 is spaced apart from the top and bottom plates 104 to create an aperture 118 in each end portion 107 of the vertical support 102. Each aperture 118 is sized to receive the tensioned strap 126 therethrough. A force-distributing member 122 is positioned in the aperture 118 and a strap-alignment member 124 is positioned in the force-distributing member to align and distribute loads from the respective tensioned strap 126.

Figure 2:
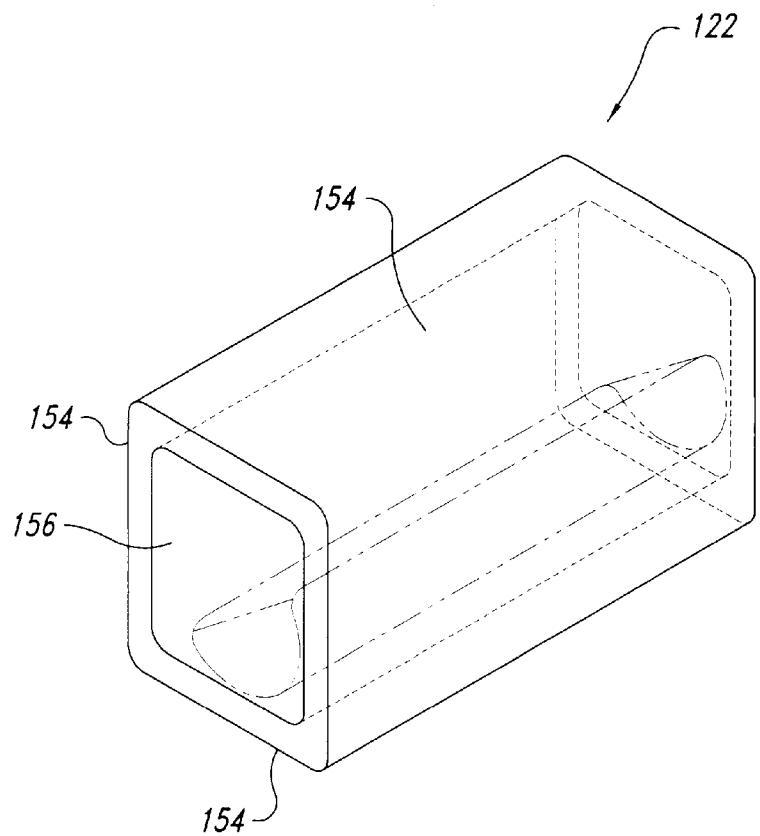
FIG. 2 is an enlarged isometric view of the force-distributing member of FIG. 1, shown removed from the shear frame assembly.

As best seen in FIG. 2, the force-distributing member 122 is a generally tubular member having a substantially square, hollow cross-sectional shape and having an outer surface 154 and an inner surface 156. The cross-sectional shape of the force-distributing member 122 substantially corresponds to the same of the aperture 118. When the force-distributing member 122 is positioned in the aperture 118, as shown in FIG. 1, the outer surfaces 154 engage the ends of the shear block 106 and the vertical support's middle stud 114. In the exemplary embodiment, the vertical supports 102 and the shear blocks 106 are wood member with the wood grains running substantially longitudinally. Accordingly, the two sides of the force-distributing member 122 is in alignment with the grain, so as to abut the end grain.

The force-distributing member 122 of the exemplary embodiment is made of a steel tube. The force-distributing member 122 in alternate embodiments can be made of other rigid metal, rigid plastic, or any other material capable of withstanding the applied loads without deformation. In the exemplary embodiment, the force distributing member 122 has a length that is slightly less than the length of the aperture 118. Accordingly, the force-distributing member 122 does not extend out of the aperture 118.

Figure 3:
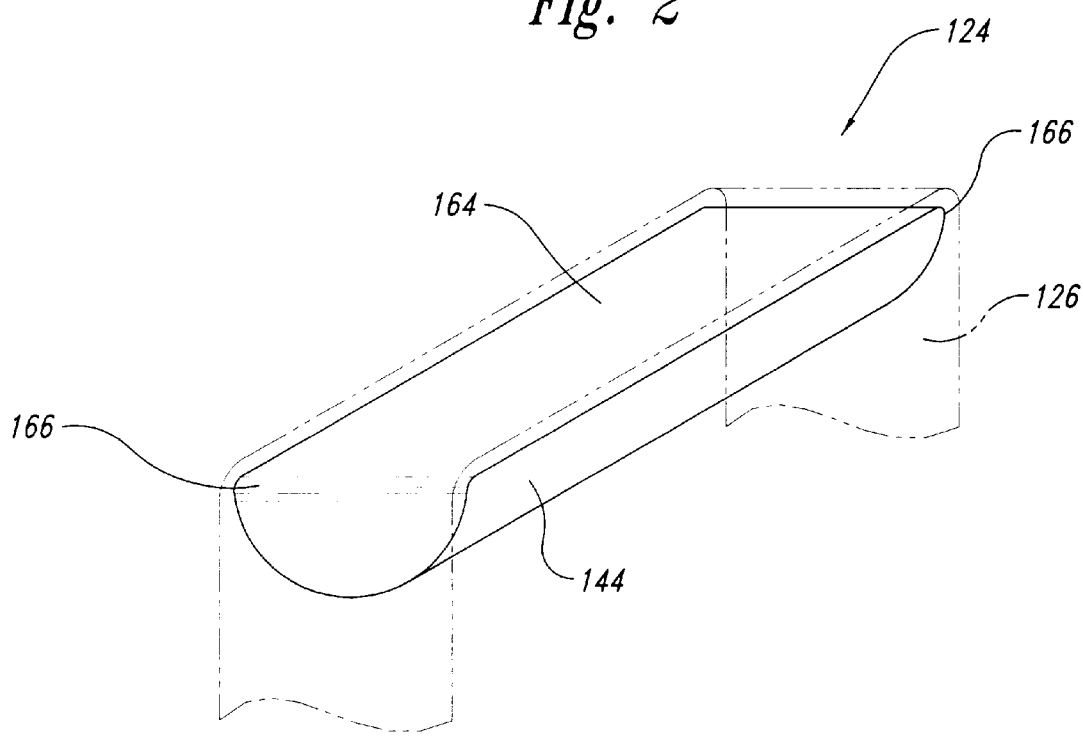
FIG. 3 is an enlarged isometric view of a band alignment member of FIG. 1 shown removed from the shear frame assembly, and the tensioned flexible straps shown in phantom lines.

As best seen in FIGS. 1 and 3, the strap-alignment member 124 is a generally semi-cylindrical member that receives the tensional strap 126, shown in phantom lines, and aligns the tensioned strap relative to the force-distributing member 122 (FIG. 1). Accordingly, the strap-alignment member 124 is sandwiched between the tensioned strap 126 and the force-distributing member 122, thereby transmitting loads from the tensioned strap to the force-distributing member.

The strap-alignment member 124 has a semi-cylindrical engaging surface 144 that slidably engages the inner surface 156 of the force-distributing member 122 (FIG. 2). The strap-alignment member 124 also has a strap engaging surface 164 that engages the tensioned strap 126, shown in phantom lines. The ends of the strap engaging surface 164 transition into two rounded corners 166 that the tensioned strap 126 wraps around so as to help evenly distribute the load applied by the tensioned strap and to reduce stress concentrations in the tensioned strap as it is redirected toward the opposite corner 107 of the shear frame 100. The strap-alignment member 124 has a length that is slightly greater than the length of the aperture 118 and the force-distributing member 122. Accordingly, the strap-alignment member 124 projects out of the aperture 118 and helps prevent the tensioned strap 126 from impinging on the vertical support 102 and creating a stress point in the strap.

The strap-alignment member 124 of the exemplary embodiment is a member solid made of rigid plastic. In alternate embodiments, the strap-alignment member 124 is made of metal or other selected material capable of withstanding the loads applied thereto without deformation.

The force-distributing member 122 and the strap-alignment member 124 are complementary components. The strap-alignment member 124 provides surfaces that engage both the tensioned strap 126 and the force-distributing member 122, thus transferring the load from the tensioned strap 126 to the force-distributing member 122. Because the strap-alignment member 124 can rotate about its longitudinal axis when positioned in the aperture 118 (FIG. 1), the strap-alignment member keeps the tensioned strap 126 properly aligned as the strap loops through the aperture. The force-distributing member 122 is interposed between the strap-alignment member 124 and at least part of the perimeter of the aperture 118 and directs the force applied by the tensioned strap 126 axially into the support member's middle stud 114 and the shear block 106 in a direction substantially parallel with the wood's grain. This way of attaching the tensioned straps 126 at the corner areas 107 enhances the strength of the shear frame 100, particularly where the studs are made of wood, because wood is substantially stronger along the direction substantially parallel to the grain than along the direction substantially perpendicular transverse to the grain.

Figure 4:
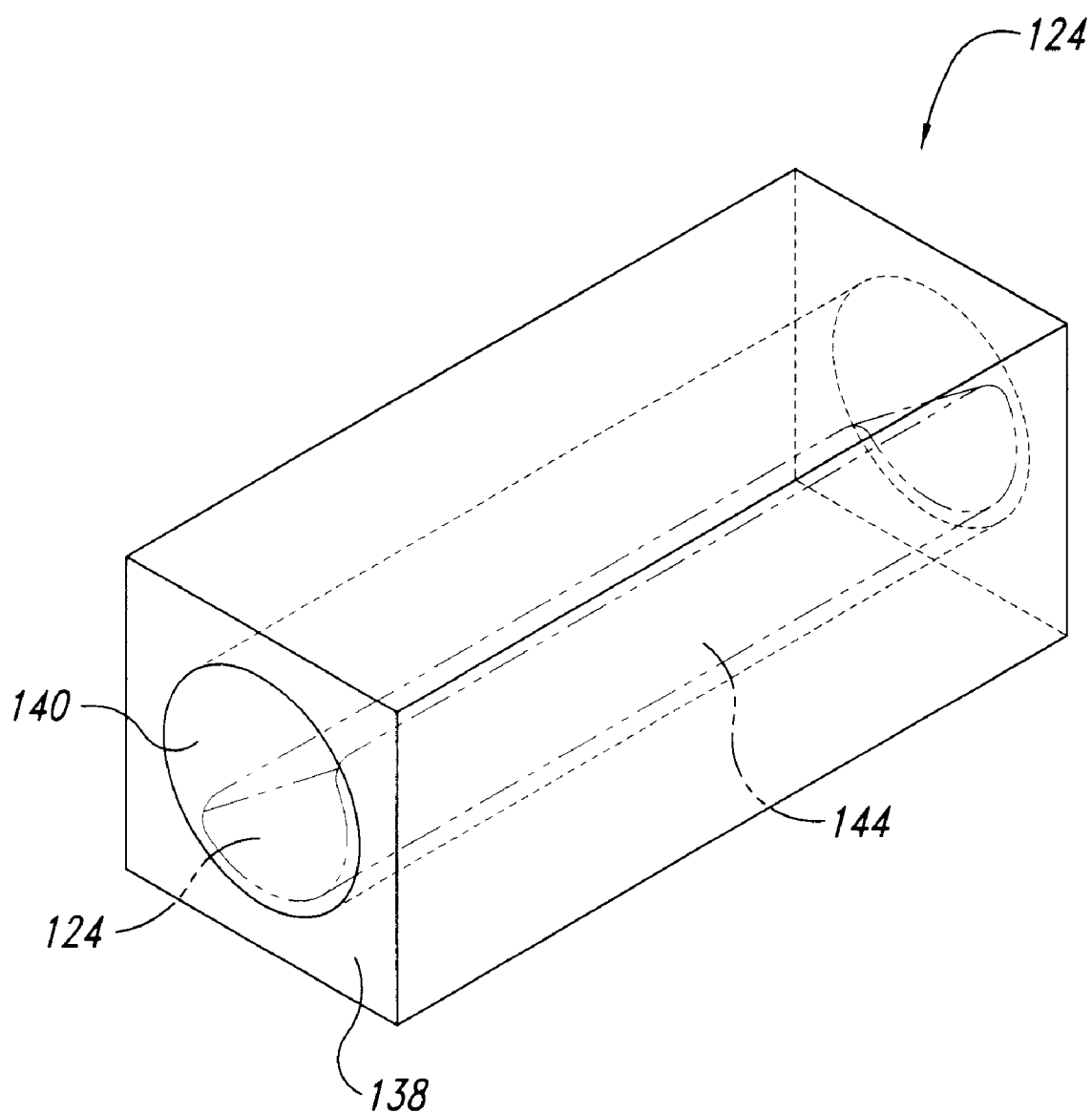
FIG. 4 is an enlarged isometric view of an alternate embodiment of a force-distributing member positionable in the corner area of the shear frame assembly of FIG. 1.

As best seen in FIG. 4, an alternate embodiment of the force-distributing member 122 includes a block 138 having an aperture 140 extending axially throughout its entire length. The cross-sectional size and shape of the block 138 substantially corresponds to the cross-sectional size and shape of the aperture 118 (FIG. 1), while the length of the block 138 is slightly less than the depth of the aperture. The hole 140 is sized to receive the strap-alignment member 124, shown in phantom lines, and the hole's diameter is sized so the block slidably engages the engaging surface 144 of the strap-alignment member 124. When the block 138 is positioned in the aperture 118 (FIG. 1), it engages the entire perimeter of the aperture defined by the outer stud 112, the middle stud 114, the shear block 106, and the respective top or bottom plate 104. The block 138 in this alternate embodiment is made of a rigid plastic material. In other alternate embodiments, the block is metal, or another rigid material capable of withstanding the loads applied by the tensioned straps without deformation.

Figure 5:
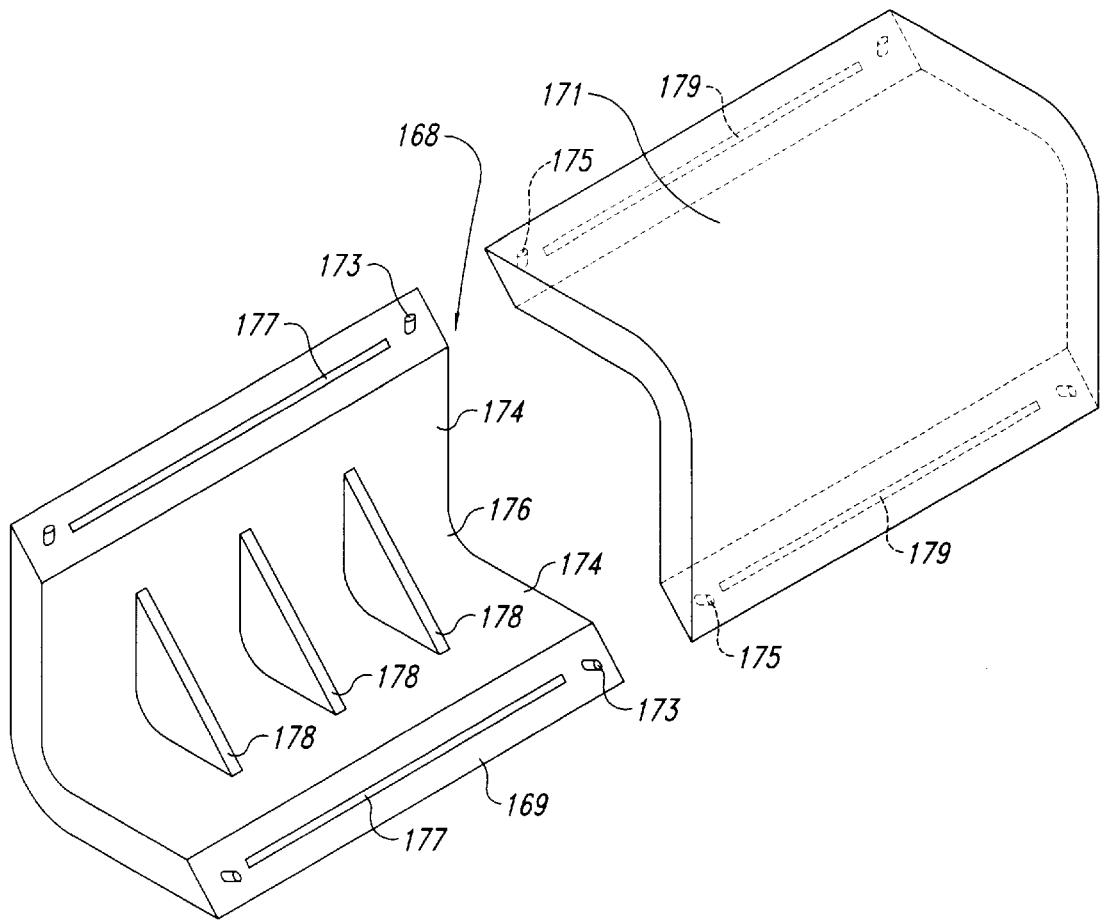
FIG. 5 is an enlarged partially exploded isometric view of an alternate embodiment of the force-distributing member positionable in the corner area of the shear frame assembly of FIG. 1.

As best seen in FIG. 5, another alternate embodiment of a force-distributing member 168 is a two-piece member having an L-shaped first member 169 that removably mates with an L-shaped second member 171 to define a substantially hollow square member. The square cross-sectional shape is sized to substantially correspond to the size of the aperture 118 in the frame's corner areas 107 (FIG. 1). The L-shaped, first and second members 169 and 171 are held together by alignment pins 173 on the first member that mate with alignment apertures 175 on the second member. In addition, the L-shaped first member 169 has elongated grooves 177 that removably receive elongated tongues 179 on the L-shaped second member 171. Accordingly, the L-shaped first and second members 169 and 171, once joined together, will not slip apart when inserted in the aperture 118 in the frame's corner area (FIG. 1). The force distributing member 168 also includes a series of spaced apart ribs 178 attached to the legs 174 of the L-shaped, first member 169. The ribs 178 extend toward the L-shaped second member 171, so as to project partially into the space between the L-shaped first and second members. In this exemplary embodiment, the force-distributing member 168 is made of a rigid plastic material. In alternate embodiments, the force-distributing member 168 is made of metal or another rigid material capable of withstanding the applied loads without deformation.

Figure 6:
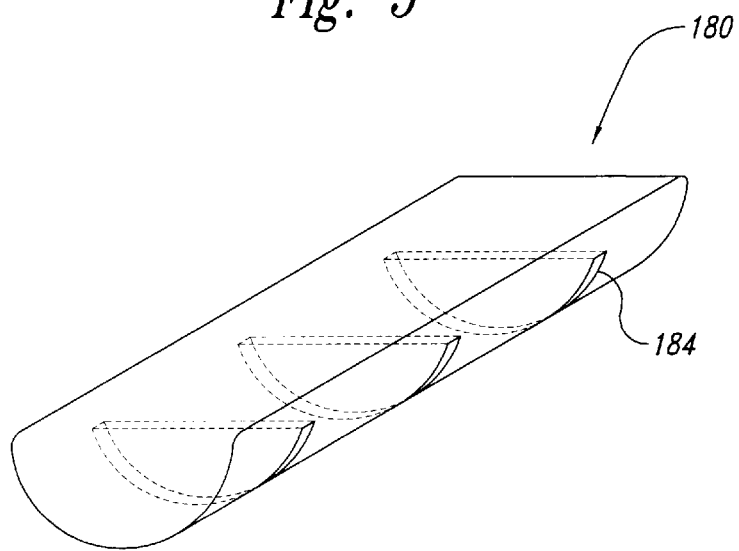
FIG. 6 is an isometric view of an alternate embodiment of the strap-alignment member of FIG. 3.

As best seen in FIG. 6, an alternate embodiment of the strap-alignment member 180 is shaped and sized to mate with the force-distributing member 168 discussed above, and shown in FIG. 5. The strap-alignment member 180 includes has a shape similar to the strap-alignment member discussed above and shown in FIG. 3, and it has a series of slots 184 that removably receive the ribs 178 projecting from L-shaped first member 169 (FIG. 5) and prevent the strap-alignment member from sliding axially. The strap-alignment member 180 of this alternate embodiment is made of a rigid plastic, but can be made of metal or other rigid material capable of sustaining the applied loads without deformation.

Figure 7:
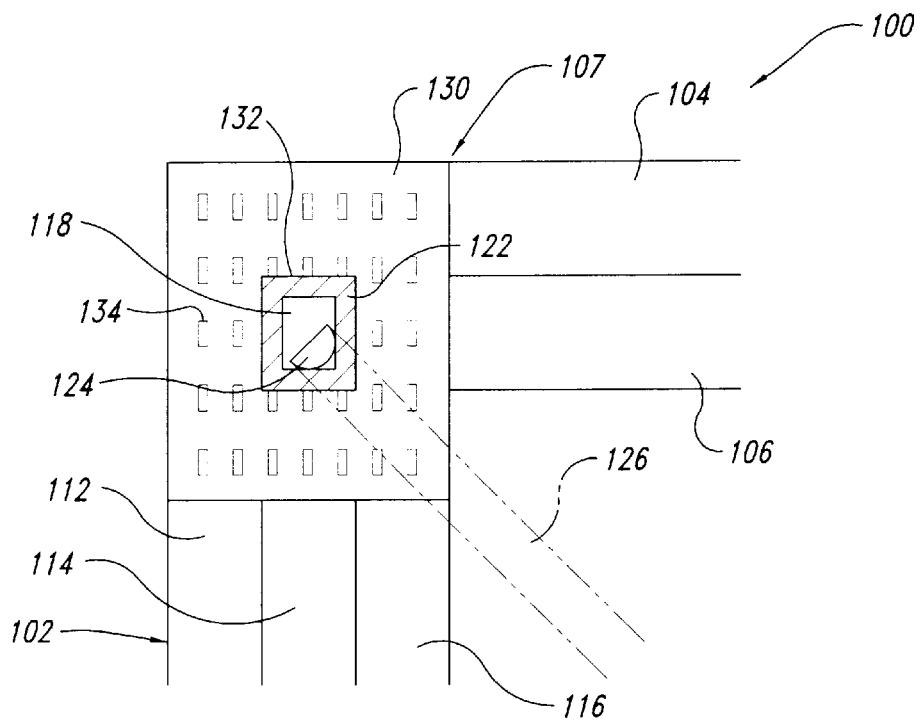
FIG. 7 is an enlarged side elevation view of an upper corner area of an alternate embodiment of the shear frame assembly of FIG. 1 showing a reinforcing truss plate with a strap-receiving aperture therein, and the tensioned strap shown in phantom lines.

As best seen in FIG. 7, an alternate embodiment of the shear frame 100 includes a plate connector 130 attached to the vertical supports 102 and the top plate 104 at the corner area 107. The plate connector 130 is a rigid metal truss plate having an enlarged aperture 132 shaped and sized to at least receive the tensioned strap 126 therethrough. In this alternate embodiment, the aperture 132 has approximately the same size as the aperture 118 in the corner area 107. The plate connector 130 is a metal plate with a series of small triangular perforations 134 punched into it so as to form a plurality of nail-like elements that penetrate the vertical support 102 and the top plate 104 frame members. Accordingly, the nail-like elements attach the plate connector 130 to the frame's corner area 107.

Figure 8:
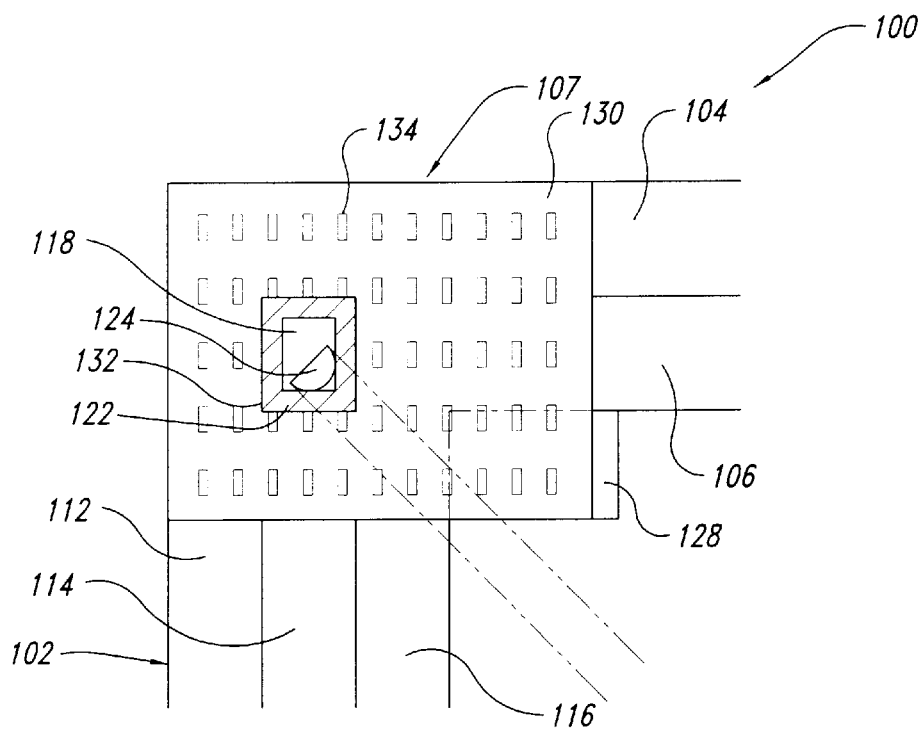
FIG. 8 is an enlarged side elevational view of an upper corner area of an alternate embodiment of the shear frame assembly of FIG. 1 showing a truss plate with a strap-receiving aperture therein, and a reinforcement block shown partially in hidden lines, and the tensioned strap shown in phantom lines.

In another alternate embodiment shown in FIG. 8, the corner areas 107 of the shear frame 100 are further strengthened by a reinforcement block 128 inserted in the corner portion formed by the shear block 106 and the vertical support's inner stud 116. The reinforcement block 128 is attached to both these members. In the embodiment shown in FIG. 8, the plate connector 130 is positioned at the corner area 107 and attached to the vertical support 102, the top plate 104, the shear block 106, and the reinforcement block 128, thereby forming a reinforced corner adapted to withstand large shear loads.

Figure 9:
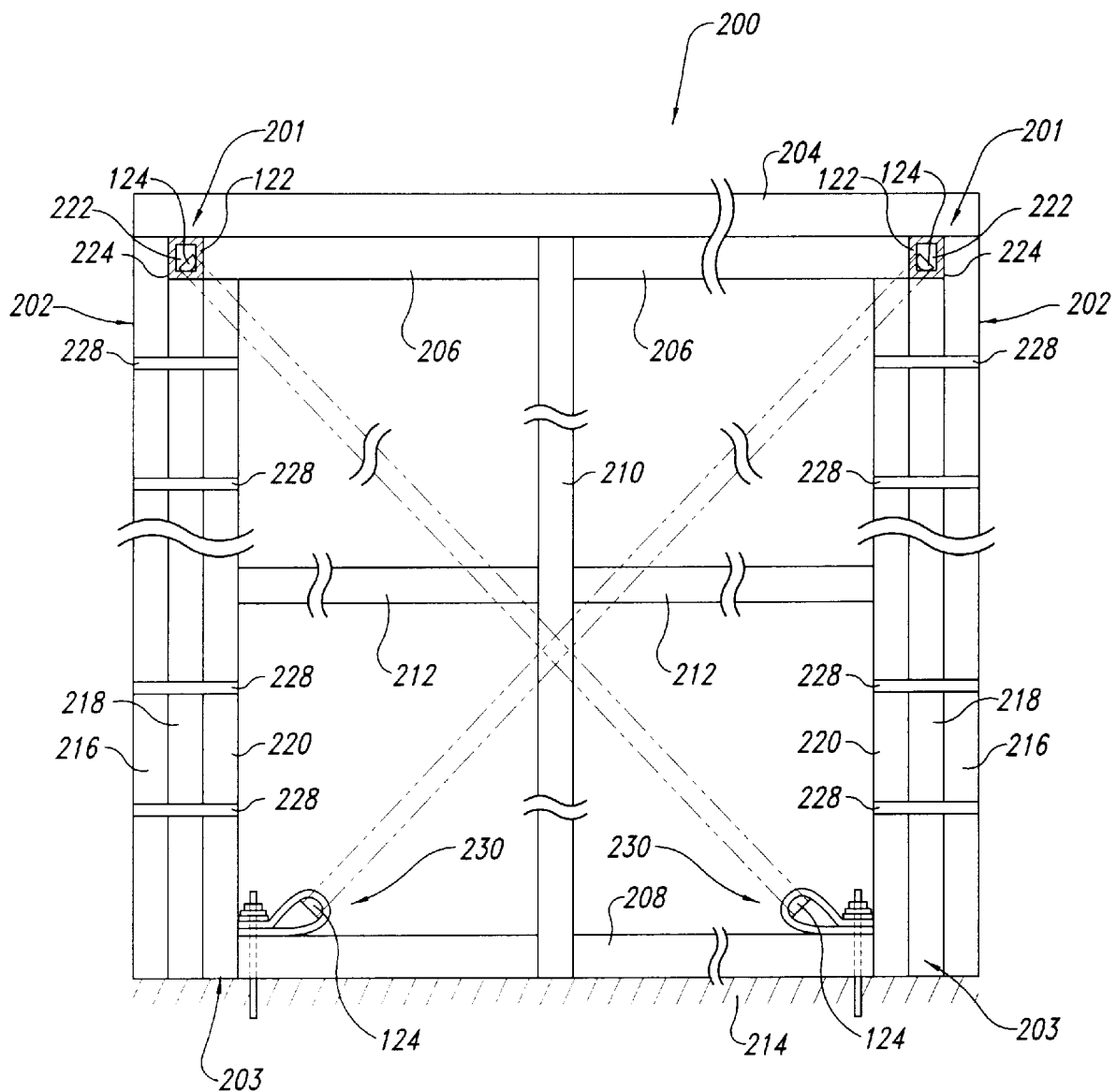
FIG. 9 is a side elevation view of a field-tensioned, shear frame assembly of an alternate embodiment of the present invention with tensioned, flexible straps shown in phantom lines.

As best seen in FIG. 9 an alternate embodiment of the shear frame assembly 200 is a field-tensioned shear frame, that is constructed at a building site, such as during the framing of the building. The shear frame assembly 200 includes two parallel vertical supports 202, a horizontal top plate 204, upper shear blocks 206, and lower shear blocks 208. Upper corner areas 201 are defined by the intersection and connection of the vertical supports 202, the top plate 204, and the upper shear blocks 206. The upper corner areas 201 are substantially identically to the corner areas 107 of the shear frame 100 discussed above and shown in FIGS. 1, 7, and 8. The field-tensioned shear frame assembly 200, however, has no lower plate; instead, the vertical supports 202 and lower shear blocks 208 rest directly on a foundation 214 or other suitable support structure.

The illustrated shear frame assembly 200 also includes intermediate studs 210 spaced between the vertical supports 202 and extending between the top plate 204 and the foundation 214. In the illustrated embodiment, intermediate shear blocks 212 extend horizontally across the middle of the shear frame assembly 200 between the vertical supports 202 and each intermediate stud 210. Although only one intermediate stud 210 is shown in FIG. 9, the exemplary embodiment has a plurality of intermediate studs, the number of which depends on the size and strength needed for the shear frame assembly 200. The number of upper shear blocks 206 and intermediate shear blocks 212 will also vary according to the size of the shear frame assembly 200.

Each vertical support 202 includes an outer stud 216, a middle stud 218, and an inner stud 220 that are held together by a flexible straps 228 wrapped around the set of studs. In the exemplary embodiment, the flexible straps 228 are metal or polyester straps that are wrapped around the vertical support 202 and attached to themselves. Since the shear frame assembly 200 has no lower plate, the outer, middle, and inner studs 216, 218, and 220 are connected directly to the foundation 214, so there is no aperture in the bottom corner areas 203. In the field-tensioned shear frame assembly 200 shown in FIG. 9, the outer, middle, and inner studs 216, 218, and 220 are wood, but may be made of any material capable of sustaining the applied loads.

Figure 10:
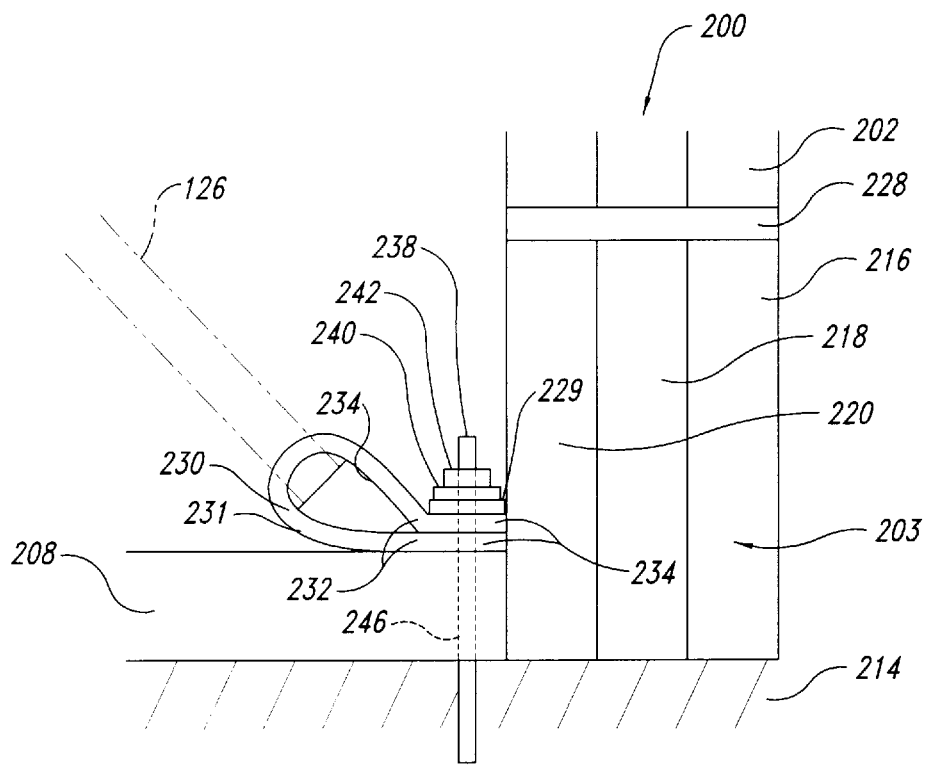
FIG. 10 is an enlarged side elevation view of the configuration of a lower corner of the shear frame of FIG. 9.
Figure 11:
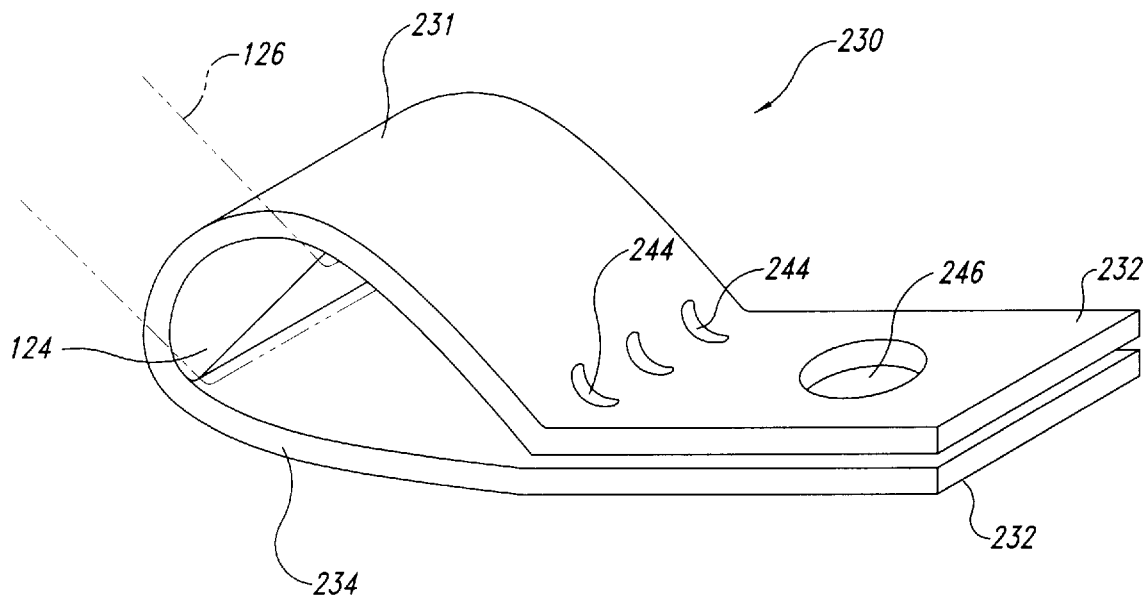
FIG. 11 is an enlarged isometric view of a band attachment member of FIG. 9, shown removed from the wall frame.

As best seen in FIG. 10, the bottom corners areas 203 of the field-tensioned shear frame assembly 200 are defined by the lower end of the vertical support 202 and the lower shear block 208 attached to the foundation 214 and the vertical support's inner stud 220. A strap attachment member 230 is secured to the top of the lower shear block 208 immediately adjacent to the inner stud 220. The strap attachment member 230 is anchored to the foundation 214 by an anchor 238 extending through the lower shear block 208 and into the foundation. As best seen in FIG. 11, the strap attachment member 230 is a shaped metal sheet or strap formed by bending the metal over on itself so the end portions 232 of the metal sheet are in contact with each other. The middle portion 231 defines a loop shaped and sized to receive strap-alignment member 124 therein. The loop is also sized to allow the tensioned strap 126, shown in phantom lines, to extend therethrough over the strap-alignment member 124. In the exemplary embodiment, reinforcement ribs 244 are attached at the transition from the middle portion 231 to the upper end portion 232 to strengthen the strap attachment member 230.

As best seen in FIG. 10, the end portions 232 have aligned holes 246 in them, and the anchor member 238 extends through the holes and secures the strap attachment member 230 to the foundation 214. The anchor member 238 includes a fastener, such as a washer 240 and a nut 242 that engages and hold the strap-alignment member 230 against the lower shear block 208. In the illustrated embodiment, a support plate 229 is secured to the ends 232 of the metal strap by the wasther 240 and nut 242. The support plate 229 is shaped and sized to strengthen the ends 232 of the strap attachment member 230 to prevent bending or deformation when mounted in the frame's lower corner area 203 and subjected to the forces exerted on the shear frame.

Figure 12:
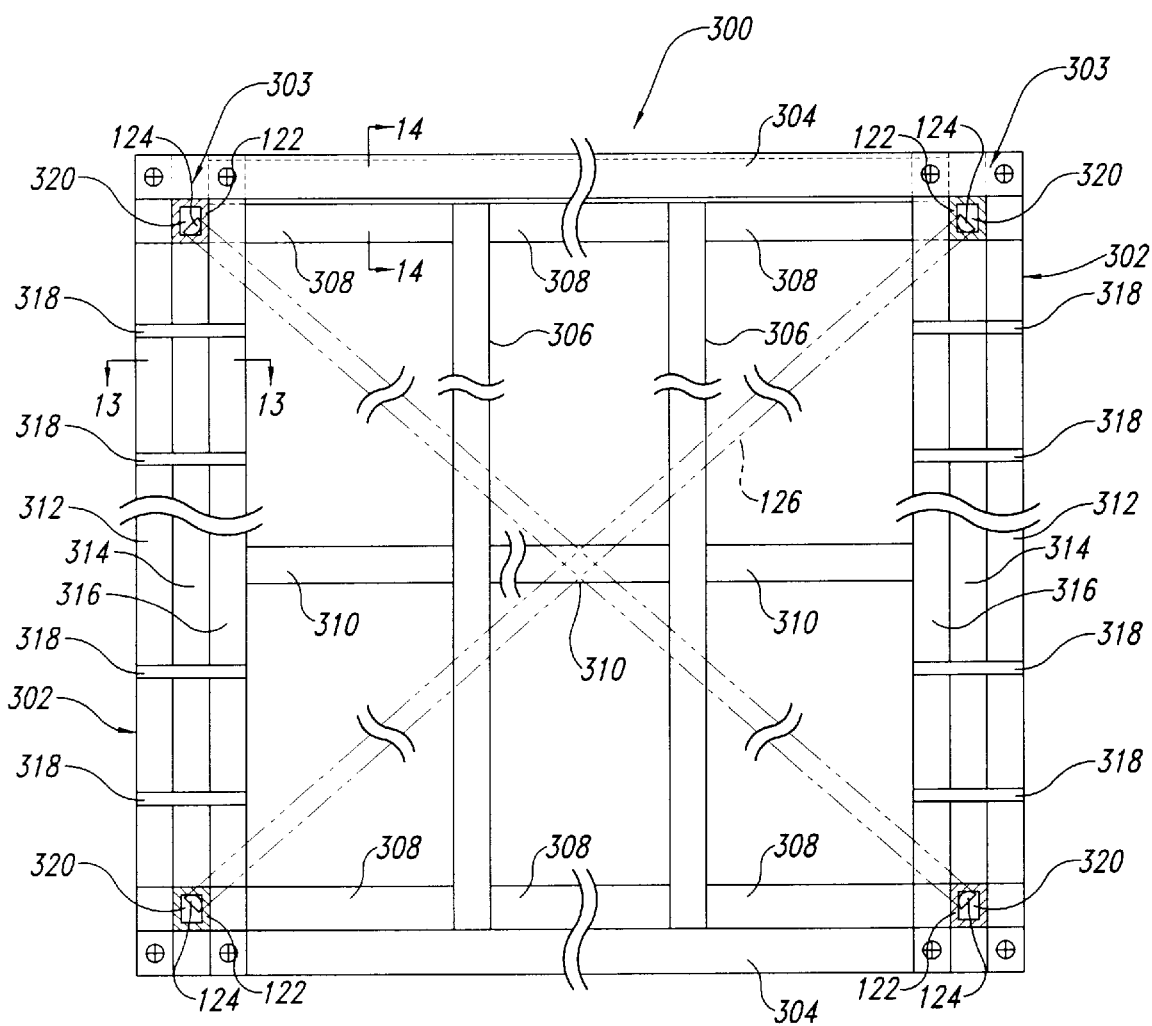
FIG. 12 is a side elevation view of a pre-tensioned metal shear frame assembly of an alternate embodiment of the present invention, with a top plate and shear blocks shown in hidden lines, and tensioned flexible straps shown in phantom lines.

An alternate embodiment of the present invention illustrated in FIG. 12 is a pre-tensioned, steel shear frame assembly 300. The shear frame assembly 300 includes two spaced apart vertical supports 302 connected to metal top and bottom plates 304. The shear frame assembly 300 also includes intermediate steel studs 306 spaced between the vertical supports 302 and connected to the top and bottom plates 304. Upper and lower shear blocks 308 connected to the top and bottom plates 304 between the intermediate studs 306 and the vertical supports 302. The metal shear frame assembly 300 of the illustrated embodiment also includes middle shear blocks 310 extending between the intermediate studs 306 and the vertical supports 302 midway between the top and bottom plates 304. In an alternate embodiment, the middle shear blocks are not used.

Each vertical support 302 includes an outer stud 312, a middle stud 314, and an inner stud 316 held together by bands 318 wrapped around the entire vertical support 302. The inner stud 316 and outer stud 312 are substantially the same length and extend between the top and bottom plate 304 and are attached thereto. The middle stud 314 is shorter than the inner and outer studs 316 and 312 and is spaced apart from the top and bottom plates 304, thus forming apertures 320 in each end portion of the respective vertical support 302. The top and bottom plates 304 extend across the width of the frame and are attached to the end portions of each vertical support 302.

Figure 13:
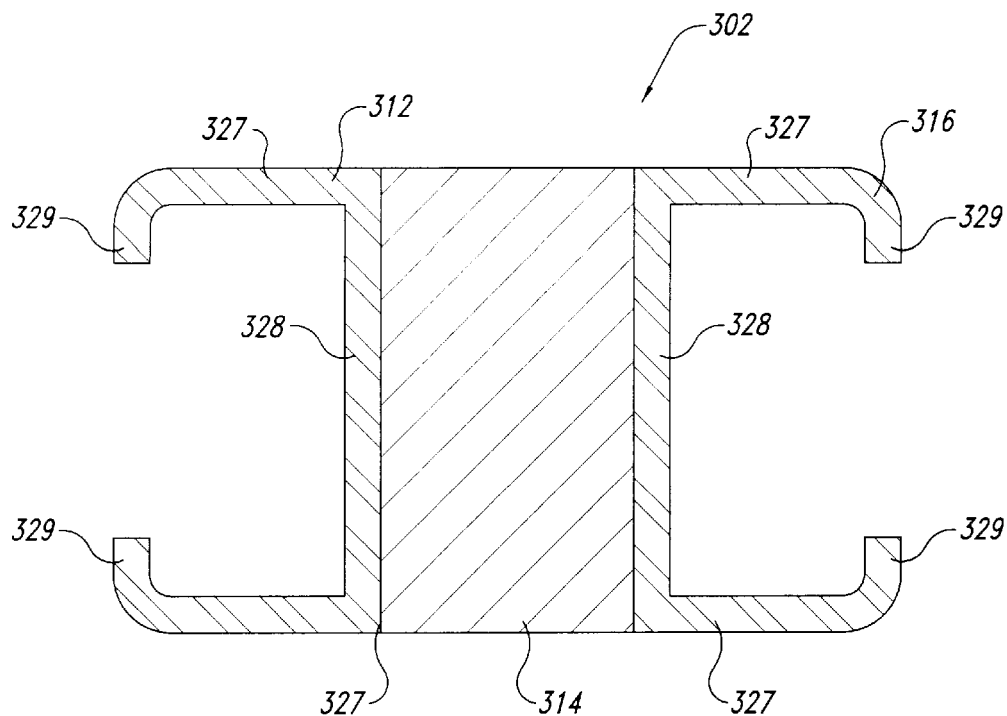
FIG. 13 is an enlarged cross-sectional view of the structural members of the shear frame assembly, taken substantially along lines 13—13 of FIG. 12.

As best seen in FIG. 13, the outer stud 312 and the inner stud 316 of the exemplary embodiment are steel C-channels each having a web 328, two flanges 327 and a lip 329 at the open end of each flange 327. The middle stud 314 is a wood stud. In alternate embodiments, the middle stud 314 is a solid, non-metal member, such as plastic or the like that is able to withstand the loads exerted on the shear frame assembly during use in a building. The vertical support 302 is constructed by abutting the web 328 of each C-channel against the middle stud 314, thereby sandwiching the middle stud between the outer and inner studs 312 and 316.

Figure 14:
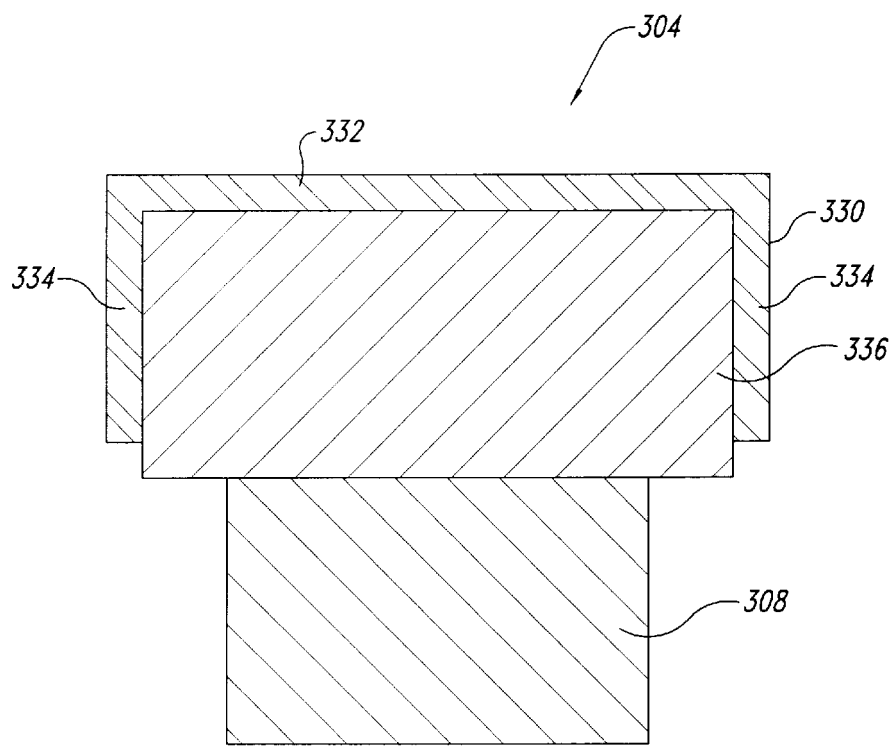
FIG. 14 is an enlarged cross-sectional view taken substantially along lines 14—14 of FIG. 12 showing a transverse member of the shear frame assembly.

As best shown in FIG. 14, each top and bottom plate 304 includes a metal U-channel 330 having a web 332 and two flanges 334. To add strength to the bottom plate 304, a wood block 336 is placed between the flanges 334 of the U-channel 330 with one face of the block 336 abutting the web 332. Each shear block 308 is in turn attached to the exposed face of the wood block 336. As with the vertical supports 302, alternate embodiments utilizing different combinations of material and shape are possible for the top and bottom plates 304.

Figure 15:
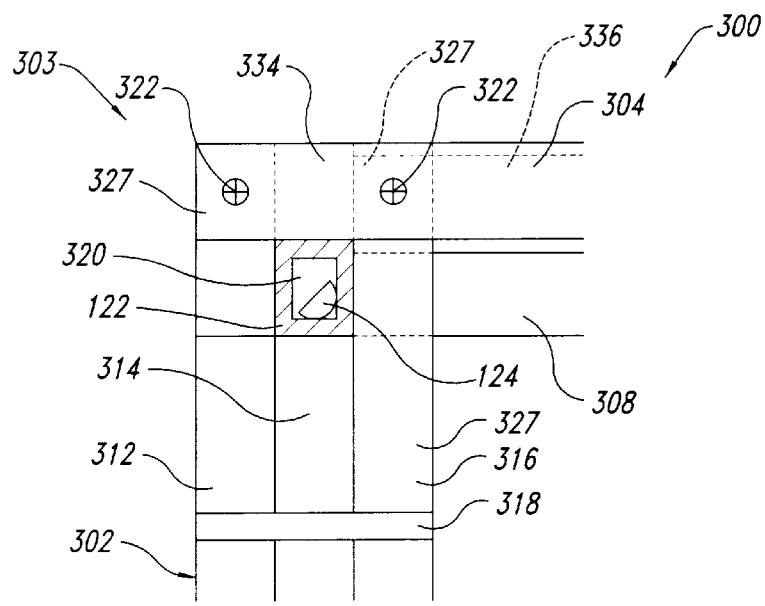
FIG. 15 is an enlarged side elevation view of an upper corner of the shear frame assembly of FIG. 12.

The four corner areas 303 of the pre-tensioned, steel shear frame assembly 300 have the same construction, so only an upper corner area is discussed in detail, with the description being applicable to the other corner areas. As best seen in FIG. 15, the outer stud 312 and inner stud 316 of the vertical support 302 are sized so that they fit between the flanges 334 of the top plate 304. The flanges 327 of the outer and inner studs 312 and 316 are fastened to the flanges 334 of the top plate 304 by fasteners 322. The wood block 336 positioned in the top plate 304 terminates immediately adjacent to the inner stud 316, so as to provide additional shear strength at the top plate.

The aperture 320 in the corner area 303 is aligned with the vertical support's middle stud 314, and a force-distributing member 122 is placed in the aperture 320. The force distributing member 122 abuts the end of the middle stud 314 and the web of the inner stud 316. A strap-alignment member 124 is also placed in the aperture 320 such that the force distribution member 122 is between the strap-alignment member and the middle stud 314 and the outer stud 316. Both the force-distributing member 122 and the strap-alignment member 124 are of the type discussed above.

Figure 16:
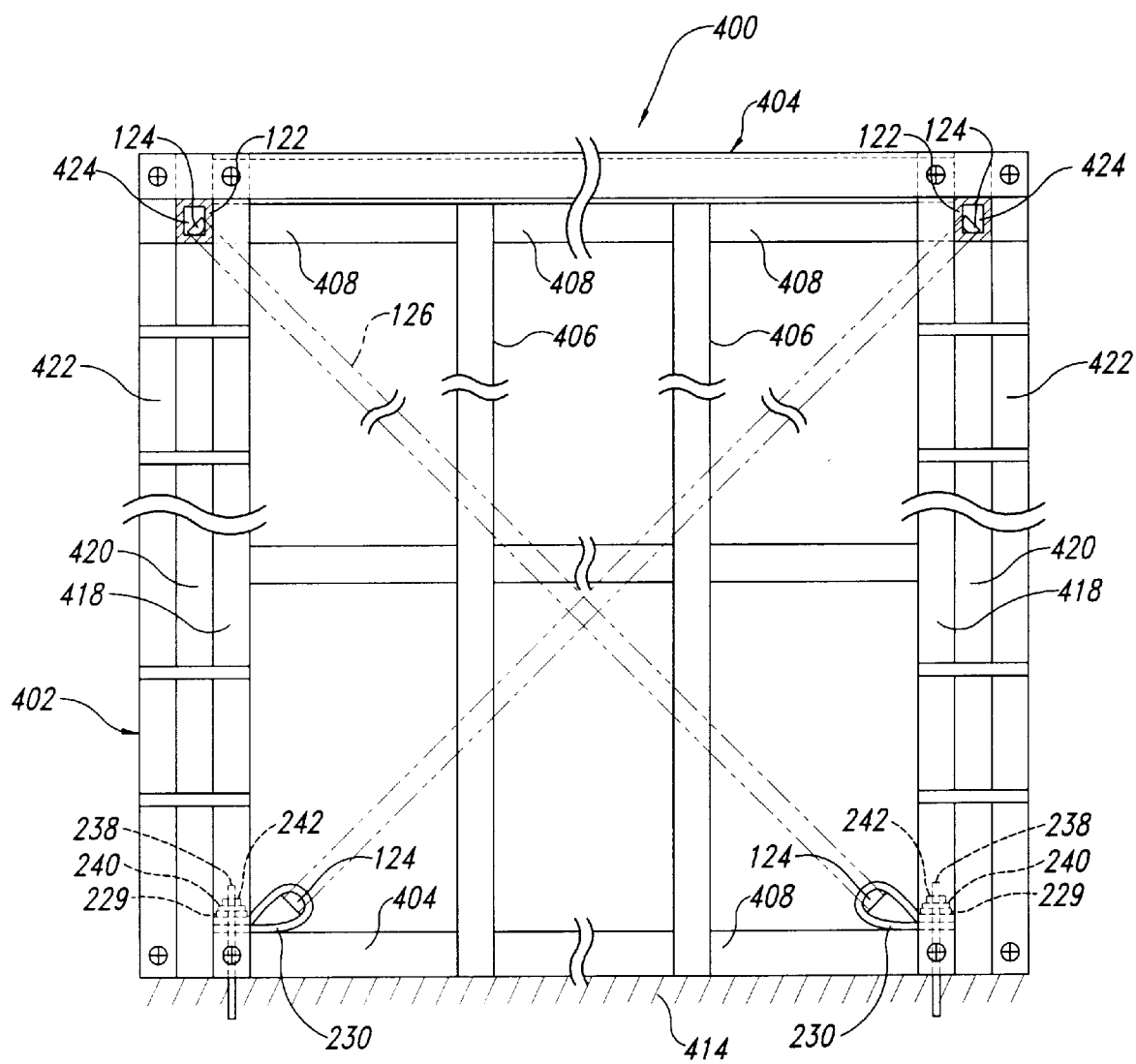
FIG. 16 is a side elevation view of a field-tensioned metal shear frame assembly of an alternate embodiment of the present invention.

In an alternate embodiment, shown in FIG. 16, a shear frame assembly 400 is a field-tensioned frame that is constructed at a building site, such as during the framing of the building's walls. The shear frame assembly 400 is tensioned by a pair of diagonal tensioned straps 126, shown in phantom lines. The field-tensioned shear frame assembly 400 has a similar construction as the pre-tensioned stud shear frame assembly discussed above, with the same construction as the upper corner areas. The lower corner areas, however, have different constructions.

The shear frame assembly 400 has a pair of spaced-apart vertical supports 402 interconnected by top and bottom plates 404, and metal studs 406 are spaced between the vertical supports. The lower ends of each vertical support 402 are connected directly to the foundation 414. Lower shear blocks 408 are also connected to the foundation and positioned between the vertical support 402 and the intermediate studs 406. The lower corner areas 403 are defined by the lower end of the vertical support 402 and the shear block 408 immediately adjacent to the vertical support.

Figure 17:
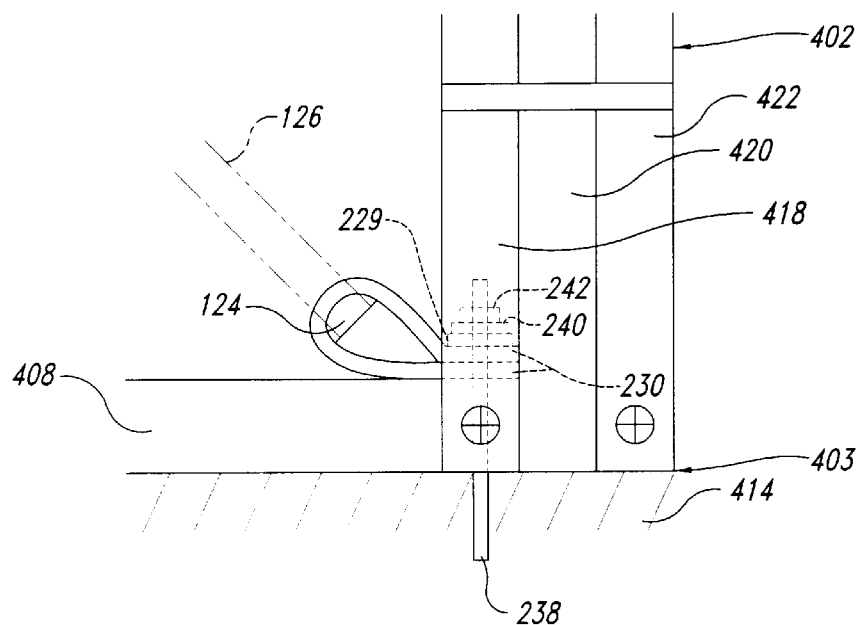
FIG. 17 is an enlarged side elevation view of a lower corner of the shear frame assembly of FIG. 16.

As best seen in FIG. 17, the structural members 402 is formed by inner, middle, and outer studs, 418, 420, and 422 that and thus each of the three studs rest on the foundation 414, and the shear block 408 is immediately adjacent to the inner stud 418.

A strap attachment member 230, as discussed above and shown in FIG. 11, is secured to the shear block 408 and firmly fixed in place by an anchor member 238 extending through the shear block and anchored into the foundation 414. A washer 240 and nut 242 on the anchor member 238 hold the support plate 229 and the strap attachment member 230 securely on the shear block 408. A strap-alignment member 124 is inserted inside the loop of the strap attachment member 230 as discussed above.

Figure 18:
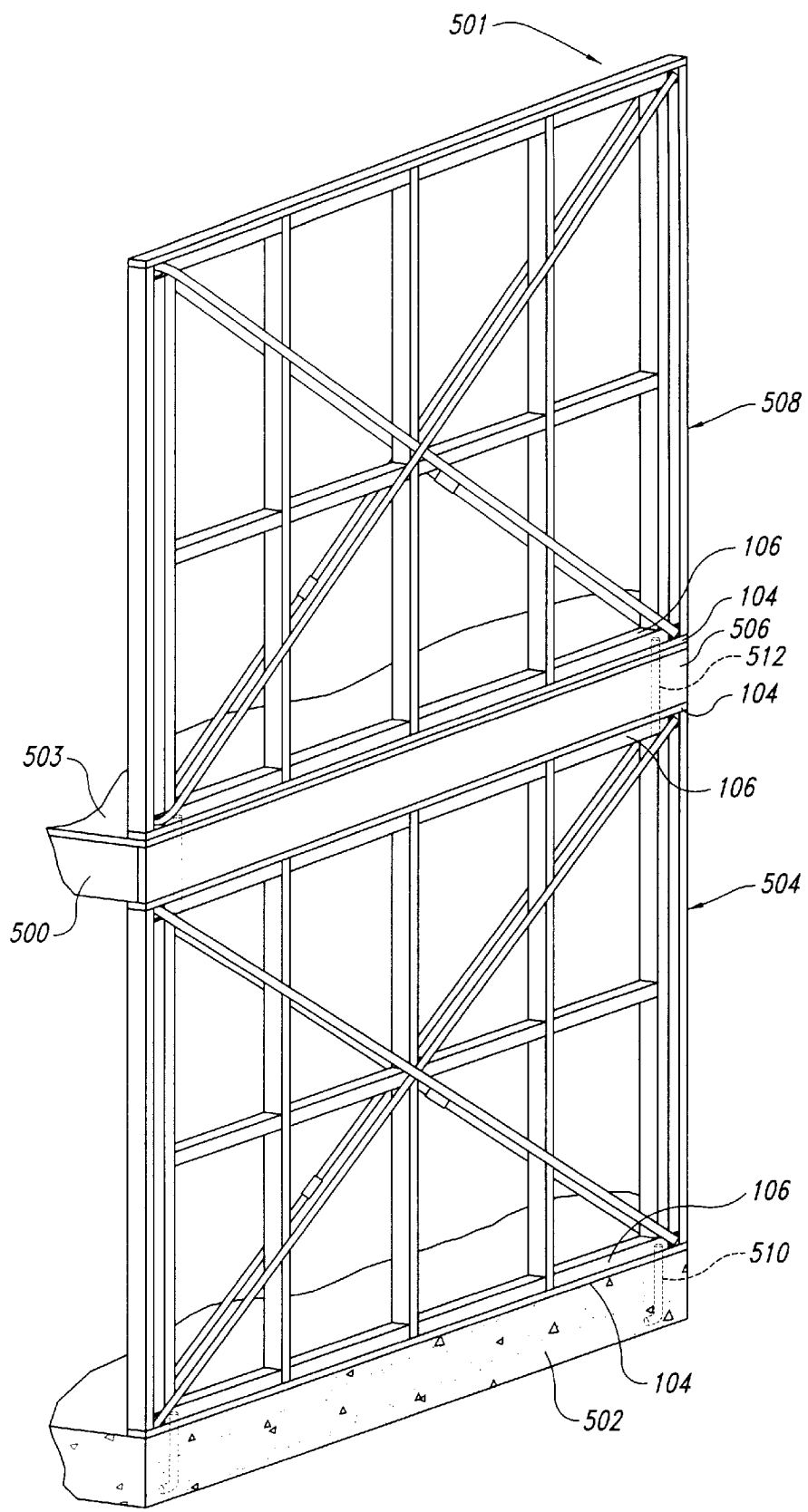
FIG. 18 is an isometric view of a two-story wall constructed using the pre-tensioned, shear frame assembly of FIG. 1.

As best seen in FIG. 18, an embodiment of the present invention includes a building system 501 for a wall section 500 of a two-story structure 503 formed by wall sections 500 including shear frame assemblies, such as the shear frame assembly 100 discussed above and shown in FIG. 1. The building wall 500 can also be formed by a plurality of other shear frame assemblies, including wood, field-tensioned assemblies, or steel assemblies that are either field-tensioned or pretensioned shear frame assemblies discussed above.

The wall section 500 is securely connected to a foundation 502, and includes a first story shear frame assembly 504, a second story shear frame assembly 508, and a floor/ceiling 506 sandwiched between the first and second story shear frame assemblies. The floor/ceiling 506 is so designated because it forms both the floor of the second story and the ceiling of the first story.

The first story shear frame assembly 504 is securely attached to the foundation 502 by anchor members 510 which are rigidly attached to the foundation 502 and extend through the bottom plate 104 and the lower shear blocks 106. Both the first story shear frame assembly 504 and the second story shear frame assembly 508 are attached to the floor/ceiling 506 using anchor members 512. The anchor members 512 extend through the bottom plate 104 and the lower shear block 106 of the second story shear frame assembly 508, down through the entire floor/ceiling 506, and through the upper plate 104 and upper shear block 106 of the first story shear frame assembly 504. The floor/ceiling 506 and the second story shear frame assembly 508 are thus secured to the foundation through their securement to first story shear frame assembly 504.

Figure 19:
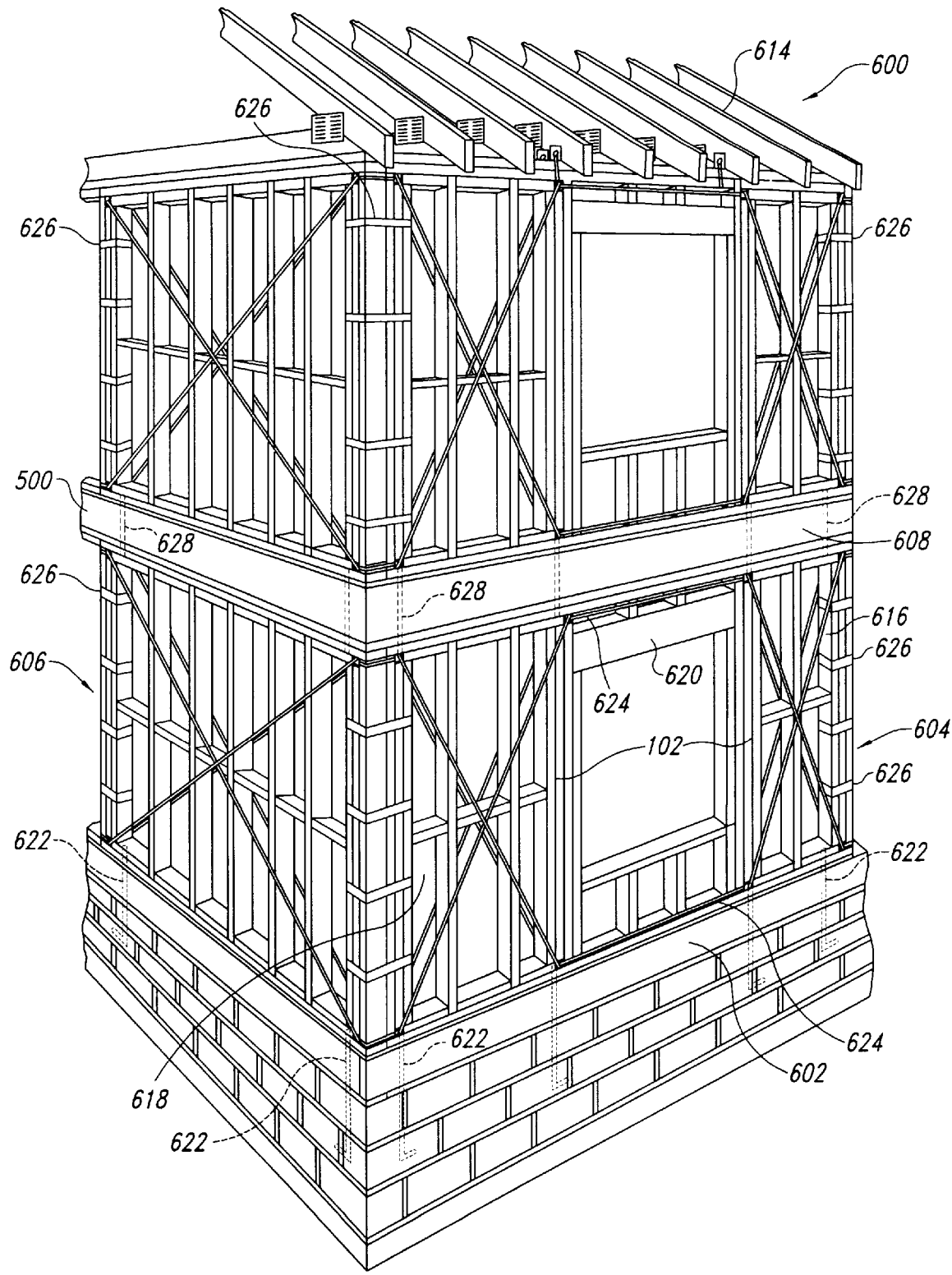
FIG. 19 is a partial isometric view of a two-story building constructed using the pre-tensioned, shear frame assemblies of FIG. 1.

As best seen in FIG. 19, the wall section 500 is included in a building structure 600 using the wall frame of the first embodiment shown in FIG. 1. The building structure 600 includes a foundation 602, a front wall 604, a sidewall 606, a floor/ceiling member 608, and a roof 614.

The front wall 604 includes two lower shear frame assemblies 616 and 618 separated by a window section 620. Each of the lower shear frame assemblies 616 and 618 are attached to the foundation 602 via anchor members 622. The window section 620 is attached to the lower shear frame assemblies 616 and 618 by metal bands 624 that wrap around the vertical supports 102 on each side of the window section. In one embodiment during construction, the front wall 604 would be assembled by first installing each of the shear frame assemblies 616 and 618 building the window section 620 to fit between the shear frame assemblies and banding the window frame to the shear frame assemblies.

As with the front wall 604, the illustrated sidewall 606 has a wall panel attached to the foundation 602 via anchor member 622. At the corner of the building where the sidewall 606 intersects the front wall 604, the adjacent vertical supports of the shear frame assemblies 606 and 618 are joined together by a series of bands 626, thereby securely connecting the adjacent shear frame assemblies together. Both the front wall 604 and the sidewall 606 are connected at their tops to the floor/ceiling 608 using anchor members 628.

In one embodiment, the shear frame assemblies are connected to premanufactured wall panels during panelized construction of a building. The shear frame assemblies are placed in selected locations to accommodate the maximum stresses and loads to which the building may be exposed. In an alternate embodiment, the shear frame assemblies are positioned and secured in place, with spaces therebetween. The rest of the wall sections are then framed in by the builders. In this embodiment, if the foundation dimensions are not accurate or other design inaccuracy is detected, connection can easily be made by the builders while framing the sections between the shear frame assemblies.

In another embodiment, the field-tensioned shear frame assemblies are constructed at the job site and secured to the foundation. The tensioned straps are installed at the corner sections and tensioned with a conventional strap tensioner. The ends of the tensioned straps are connected together with strap seals, such as crimp seals, open seals, or semi-open seals, so as to maintain the tension in the straps and to pre-load the shear frame assemblies. The shear frame assemblies are then connected to adjacent wall sections framed by the builders. As a result, a building can be constructed in a very efficient and cost effective manner.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A shear frame assembly comprising:
   a pair of laterally opposed structural members each having a first end portion;
   an aperture positioned adjacent the first end portion of the structural members;
   diagonal tensioning members adapted to be received by and aligned through the aperture, said aperture being sized to receive one of the diagonal tensioning members therethrough;
   a transverse member extending between the first end portions of the structural members;
   an alignment member in each aperture, each alignment member being positioned to receive and align the diagonal tensioning members within the aperture; and
   a force-distributing member positioned in each aperture and interposed between the alignment member and the respective structural member.

2. The shear frame assembly of claim 1 wherein the apertures are first apertures, and the structural members each have a second end portion and a second aperture adjacent the second end portion, the second aperture being sized to receive another one of the diagonal tensioning members therethrough, and further comprising:
   a second alignment member in each second aperture positioned to receive and align another one of the diagonal tensioning members within the second aperture; and
   a second force-distributing member positioned in each second aperture and interposed between the second alignment member and the respective structural member.

3. The shear frame assembly of claim 2, further comprising a second transverse member extending between the second end portions of the structural members.

4. The shear frame assembly of claim 1 wherein each structural member comprises first, second and third studs, the second stud being between and shorter than the first stud and with the aperture being axially aligned with the second stud.

5. The shear frame assembly of claim 4 wherein the first and third studs are metal and the second stud is a solid non-metallic material.

6. The shear frame assembly of claim 5 wherein the non-metallic material is wood.

7. The shear frame assembly of claim 4 wherein the first, second and third studs are held together by bands wrapped therearound.

8. The shear frame assembly of claim 1 that is positionable on a support structure, further comprising an anchor member coupled to one of the structural members to connect the one of the structural members to the support structure.

9. The shear frame assembly of claim 1 wherein each structural member includes a second end portion, and further comprising an attachment member adjacent to the second end portion of the structural member and being connectable to one of the diagonal tensioning members.

10. The shear frame assembly of claim 9 wherein the attachment member has an opening therethrough sized to receive the one of the diagonal tensioning members, and further comprising a second alignment member positioned in the opening to receive and align the one of the diagonal tensioning members within the opening.

11. The shear frame assembly of claim 1, further comprising a plate connector attached to the structural member, the plate connector having an aperture therein aligned with the aperture in the structural member.

12. The shear frame assembly of claim 11 wherein the plate connector aperture is substantially the same size as the aperture in the structural member.

13. The shear frame assembly of claim 1, further comprising a force distribution block attached to the first end portion of at least one structural member adjacent to the transverse member.

14. A shear frame assembly of the type having diagonal tensioning members that provide resistance to shear loads comprising:
a pair of laterally opposed structural members, each structural member having first end portions and each structural member comprising first, second and third studs, wherein the second stud is between the first and third studs, the second stud is shorter than the first stud, so as to form an aperture axially aligned with the second stud;
diagonal tensioning members positioned in the apertures;
a transverse member extending between the first end portions of the structural members;
a shear block positioned in at least one corner formed by the structural member and the transverse member, the shear block abutting the structural member;
an alignment member on each aperture positioned to receive and align the diagonal tensioning member within the aperture; and
a force-distributing member positioned in each aperture and interposed between the alignment member and the respective structural member.

15. The shear frame assembly of claim 14 wherein the second stud is sandwiched between the first and third studs, the first and third studs are metal, and the second stud is a solid non-metallic material.

16. The shear frame assembly of claim 14 wherein the structural members are held together by bands wrapped therearound.

17. The shear frame assembly of claim 14 wherein the structural members are held together by truss plate connectors.

18. The shear frame assembly of claim 14 wherein the apertures are first apertures and the structural members each have a second end portion and a second aperture adjacent their second end portion and further comprising:
a second alignment member positioned in each second aperture and positioned to receive and align another diagonal tensioning member within the second aperture; and
a second force-distributing member within each second aperture and interposed between the second alignment member and the respective structural member.

19. The shear frame assembly of claim 18, further comprising a second transverse member extending between the second end portions of the structural members.

20. The shear frame assembly of claim 14 wherein the structural members have second end portions and rest on a support structure, and further comprising:
an attachment member adjacent to the second end portion of the structural member and anchorable to the support structure, the attachment member having an opening sized to receive one of the diagonal tensioning members; and
a second alignment member positioned in the opening to receive and align the one of the diagonal tensioning members.

21. A building system for constructing a building using building wall sections and shear frame assemblies comprising:
a plurality of building wall frame assemblies and shear frames assemblies interconnected to each other in a configuration that forms selected walls of the building, wherein each shear frame assembly is connected to at least one other shear frame assembly, each shear frame assembly including:
a pair of laterally opposed structural members each having first end portions, and each structural member having an aperture adjacent its first end portion;
diagonal tensioning members positioned in said apertures;
a transverse member extending between the first end portions of the structural members;
an alignment member in each aperture, each alignment member being positioned to receive and align the diagonal tensioning member within the aperture; and
a force-distributing member positioned in each aperture and interposed between the alignment member and the respective structural member.

22. The building system of claim 21 wherein the apertures are first apertures, and the structural members each have a second end portion and a second aperture adjacent their second end portion, the second aperture being sized to receive another one of the diagonal tensioning members therethrough and further comprising:
a second alignment member in each second aperture positioned to receive and align the other one of the diagonal tensioning members within the second aperture; and
a second force-distributing member positioned in each second aperture and interposed between the second alignment member and the respective structural member.

23. The building system of claim 22 wherein the shear brace frame further comprises a second transverse member extending between the second end portions of the structural members.

24. The building system of claim 21 wherein each structural member includes first, second and third studs, the second stud being between and shorter than the first stud and positioned to create the first aperture in the structural member, the apertures being axially aligned with the second stud.

25. The building system of claim 24 wherein the second stud is sandwiched between the first and third studs, the first and third studs are metal, and the second stud is a solid non-metallic material.

26. The building of claim 21 wherein the shear frame assembly is positionable on a support structure, and further comprising an anchor member coupled to one of the structural members to connect the one of the structural members to the support structure.

27. The building system of claim 21 wherein the structural members each have a second end portion, and the shear brace panel further comprises an attachment member adjacent to the second end portion of the structural member, the attachment member having an opening sized to receive one of the diagonal tensioning members.

28. The building system of claim 27, further comprising a second alignment member positioned in the opening of the attachment member to receive and align the one of the diagonal tensioning members within the opening.

29. The building system of claim 21 wherein the shear frame assembly further includes a plate connector having an aperture therein, the plate connector being attached to the structural member and the plate connector aperture being aligned with the aperture in the structural member.

30. The building system of claim 29 wherein the aperture in the connector plate is substantially the same size as the aperture in the structural member.

31. The building system of claim 30 wherein the force-distributing member is positioned in the aperture such that force transferred into the member by the tensioned strap is directed parallel to a longitudinal axis of the respective structural member.

32. The building system of claim 26 wherein each shear brace panel is anchored to a support structure and to a ceiling.

* * * * *

UNITED STATES PATENT AND TRADEMARK OFFICE
CERTIFICATE OF CORRECTION

PATENT NO. : 6,185,898 B1  
DATED : February 13, 2001  
INVENTOR(S) : Robert F. Pratt Page 1 of 1

It is certified that error appears in the above-identified patent and that said Letters Patent is hereby corrected as shown below:

<u>Column 13,</u>  
Line 38, "an alignment member on" should read -- an alignment in --.

Signed and Sealed this

Seventh Day of August, 2001

Attest:

*Attesting Officer*

NICHOLAS P. GODICI  
*Acting Director of the United States Patent and Trademark Office*